United States Patent
Silventoinen et al.

(10) Patent No.: US 6,498,932 B1
(45) Date of Patent: Dec. 24, 2002

(54) METHOD AND AN APPARATUS FOR DETERMINING THE PATHLOSS BETWEEN A BASE TRANSCEIVER STATION AND A MOBILE STATION IN A MOBILE RADIO NETWORK

(75) Inventors: Marko Silventoinen, Helsinki (FI); Harri Posti, Oulu (FI)

(73) Assignee: Nokia Telecommunications Oy, Nokia Group (FI)

( * ) Notice: Subject to any disclaimer, the term of this patent is extended or adjusted under 35 U.S.C. 154(b) by 0 days.

(21) Appl. No.: 09/308,887
(22) PCT Filed: Dec. 18, 1996
(86) PCT No.: PCT/EP96/05683
§ 371 (c)(1),
(2), (4) Date: Jul. 28, 1999
(87) PCT Pub. No.: WO98/27675
PCT Pub. Date: Jun. 25, 1998
(51) Int. Cl.$^7$ ................................................ H04Q 7/20
(52) U.S. Cl. ........................ 455/424; 455/67.6; 455/69
(58) Field of Search .................... 455/424, 423, 455/436, 67.3, 13.4, 67.6, 69

(56) References Cited

U.S. PATENT DOCUMENTS

| | | | |
|---|---|---|---|
| 5,379,447 A | * 1/1995 | Bonta et al. | ............... 455/33.2 |
| 5,603,081 A | * 2/1997 | Raith et al. | ................ 455/33.1 |
| 5,740,166 A | * 4/1998 | Ekemark et al. | ............ 455/440 |
| 5,778,316 A | * 7/1998 | Persson et al. | ............. 455/434 |

FOREIGN PATENT DOCUMENTS

| | | |
|---|---|---|
| WO | WO 93/08655 | 4/1993 |
| WO | WO 95/07012 | 3/1995 |
| WO | WO 96/21987 | 7/1996 |
| WO | WO 96/21998 | 7/1996 |

* cited by examiner

*Primary Examiner*—Thanh Cong Le
*Assistant Examiner*—Thuan T. Nguyen
(74) *Attorney, Agent, or Firm*—Heller Ehrman White & McAuliffe LLP

(57) ABSTRACT

Method and an apparatus for determining the pathloss between a base transceiver station (BTS) and a mobile station (MS) in a mobile radio network. In detail, a signal carrier (BCCH) having a transmitting power ($P_{TXAV}$) is transmitted by a first base transceiver station (BTS-1). Thereafter, said signal carrier (BCCH) transmitted by said first base transceiver station (BTS-1) is received by a mobile station (MS) spatially separated from said first base transceiver station (BTS-1), and the signal level ($P_{TXAV}$) of the received signal carrier (BCCH) is detected by said mobile station (MS). Furthermore, the detected signal level ($P_{TXAV}$) of said received signal carrier (BCCH) is transmitted to a second base transceiver station (BTS-2) of a neighboring cell. In addition, the detected signal level ($P_{TXAV}$) of said signal carrier (BCCH) received by said mobile station (MS) is compared with the transmitting power ($P_{TXAV}$) of said signal carrier (BCCH) transmitted by said first base transceiver station (BTS-1). A signal is then output which indicates the difference between these two signal levels, this difference being a measure of the pathloss, L, between said first base transceiver station (BTS) and said mobile station (MS). As a result, the pathloss between a base transceiver station and a mobile station in a cellular mobile radio network (FIG. 3) is effectively determined. In turn, this permits controlling the power of the BCCH carrier, including reducing it, thereby reducing interference, and increasing the capacity and traffic.

24 Claims, 2 Drawing Sheets

METHOD AND AN APPARATUS FOR DETERMINING THE PATHLOSS BETWEEN A BASE TRANSCEIVER STATION AND A MOBILE STATION IN A MOBILE RADIO NETWORK

CROSS REFERENCE TO RELATED APPLICATION

This application is a United States National Stage Application under 35 USC §371 of International Application No. PCT/EP96/05683, filed Dec. 18, 1996 by the same inventors.

DESCRIPTION

1. Field of the Invention

The present invention relates to a method and an apparatus for determining the pathloss between a base transceiver station and a mobile station of a cellular mobile radio network such as the GSM network.

2. Background of the Invention

In recent years, the use of mobile telephones has become increasingly popular. One such mobile telephone system which is used in Europe and which is implemented as a fully digital cellular network is the GSM network set up according to the specifications of the CEPT committee "Groupe Speciale Mobile".

The GSM network belongs to the group of systems operating on the basis of TDMA (Time Division Multiple Access). In systems using TDMA, data are transmitted using successive TDMA frames. In many cases, each of these frames consists of eight time slots. In each time slot, a data packet is sent in the form of a radio frequency burst having a finite duration and consisting of a set of modulated bits. The time slots are used for transmitting control channels and traffic channels. On the control channels, signaling and synchronization information between a base station (BS) and a number of mobile stations (MS) is exchanged, whereas, on the traffic channels (TCH), data and speech are transmitted. See FIG. 1. One time slot of a traffic channel is assigned to each mobile station so that a base station may be simultaneously connected in a parallel fashion to a number of mobile stations using the same carrier frequency.

According to the GSM standard, the number of mobile stations simultaneously connectable to a single station amounts to eight. The data transfer rates are 9.6 kbit/s for data or 13 kbit/s for speech (TCH/F) as user rates. In addition, half-rate traffic channels (TCH/H) are available at 4.8 kbit/s for data which offer a doubled capacity, i.e. up to 16 mobile stations can be simultaneously connected to a base station using a single carrier frequency.

In order to establish a proper communication between a mobile station and a base station, general information concerning the base station is transmitted from the base station (BS) to the mobile station, i.e. in the downlink direction, using the so called Broadcast Control Channel (BCCH), as shown in FIG. 1. More particularly, the base station transmits TDMA frames which include one Broadcast Control Channel and at least seven full-rate traffic channels or 14 half-rate traffic channels. For transmission of signaling information, 51 frames are combined into a single multi-frame, while for transmission of traffic information, a multi-frame consists of only 26 frames. Such a multi-frame is shown in FIG. 2. The idle frame after the last of the 24 frames used for the traffic channels is not used. Furthermore, as shown in FIG. 2, a Slow Associated Control Channel (SACCH) is provided as one of the dedicated channels and is associated with a traffic channel. The Slow Associated Control Channel is used by the mobile station for transmitting different measurement results to the base station in the uplink direction. Any of a full-rate traffic channel, a half-rate traffic channel and a Standalone Dedicated Control Channel (SDCCH) is always allocated together with a Slow Associated Control Channel. On the other hand, the base station uses the Slow Associated Control Channel to transmit commands related to power control to the mobile station in the downlink direction.

FIG. 1 shows a block circuit diagram illustrating the structure of the mobile radio network including a mobile station in a single cell according to the GSM specification. The Broadcast Control Channel including the eight time slots is transmitted on the BCCH carrier in all time slots continuously with a constant power and at a standard frequency according to the GSM specification, usually with the highest allowable power. As will be described in detail below, a mobile station periodically measures the signal strength of the BCCH carrier in neighboring cells. In addition, the mobile station also determines the connection quality to the serving cell, i.e. to its own base station, by means of the bit error ratio. The results obtained are used e.g. in the handover process. A handover is a transfer of a mobile station from one channel to another channel of the same cell (intracell handover) or a transfer of the mobile station from one cell to another (neighboring) cell (intercell handover) during an ongoing call.

The power control to be implemented both in the base station as well as in the mobile station serves for minimizing channel interference and for saving energy in the mobile station so as to increase the battery life of the mobile telephone handset. The power control process always precedes a handover process. The transmitting power levels of the mobile stations can be controlled from the maximum power to as low as 20 mW in steps of 2 dB.

For handover purposes, the mobile station controller (MS) measures the signal level received from up to 32 neighboring base stations and transmits the signal levels of its serving cell as well as of those neighboring cells having the six strongest received signal levels and the signal quality value of the serving cell to its own base station. The measured signal level of the serving cell is also to be used for downlink power control, i.e. for power control of the carrier transmitted from the base station to the mobile station. This transmission of the measurement results is even performed during an ongoing call during which speech data are transmitted. The base station conveys the measurement results received from all mobile stations linked thereto to a base station controller (BSC), FIG. 1, which performs averaging and weighting on the measurement data obtained from the base station. In detail, as described above, the transmitted measurement results which are regularly updated comprise the received signal level (RXLEV) and the received signal quality (RXQUAL) of the serving cell of the mobile station as well as the received signal levels of the neighboring cells.

According to the GSM recommendation, the measurement results must be reported at least once a second to the base station. The transmitted value RXLEV of the received signal level is the average of the samples measured in a period of 480 ms containing four multi-frames. The measurement results are transmitted in another cycle of 480 ms also containing four multi-frames. On the other hand, the base station measures only the received signal level on the associated traffic channel in all time slots. The base station controller which analyses the received measurement results decides on the basis of the received data e.g. whether a handover is to be effected.

More particularly, a handover is requested in cases where the transmitting power of a mobile station cannot be further increased, where the measured values are larger or smaller than the threshold values for effecting a handover, or where the transmission could be continued with another cell having a lower pathloss than the serving cell.

From WO-96/21 987 and WO-96/21 998 originating from the applicants of the present invention, mobile radio systems are known in which a power control of the transmitter of the base station as well as of the mobile station is effected. However, since, in these two conventional systems, intercell handovers are prevented due to the fact that a subscriber is only allowed to move within his home cell, the signal strength of the BCCH carrier of neighboring stations is not measured. Therefore, the BCCH carrier is not continuously transmitted, i.e. not in all time slots of a frame, which results in that this system cannot be used for a proper mobile communication between a fixed base station and moving subscribers not restricted to a particular cell.

Furthermore, due to the radio link pathloss between transmitter and receiver the received field strength RXLEV decreases with increasing distance from the transmitter. The pathloss is a critical factor for mobile radio systems since a handover has to be effected if the measured field strength RXLEV falls below the corresponding threshold value. Since the mobile station is allowed to arbitrarily change its location within the entire area covered by the base stations, the distance between the base station and the mobile station which, apart from the carrier frequency used, determines the pathloss may also vary arbitrarily. In case of a handover effected either between two cells or two frequencies, the pathloss will even change abruptly.

Thus, none of the above described systems caters for the variable control of the power of the transmitter of the mobile station and/or the base station, taking into consideration the pathloss between the mobile station and a particular base station. Since the distance between the mobile station and the base station is inherently variable in any type of mobile radio system, and since the frequency may also change, a variable power control would allow to actually compensate for the variations of pathloss occurring between the base station and the mobile station.

For effecting a power control of the mobile station, an accurate estimation of the pathloss between the mobile station and the respective base station is required. However, in order to assess the actual pathloss between base station and mobile station, the actually transmitted signal level has to be known. Since the power of the transmitted signal usually varies from time slot to time slot, the transmitting power is not known with a sufficient accuracy. Therefore, the determination of the pathloss by calculating the difference between transmitted power and received signal level measured by the mobile station is not possible. Hence, since the actual pathloss in current GSM networks can only be obtained if the base station controller knows the power transmitted by the base station, no power control of the carrier is possible on which the Broadcast Control Channel is transmitted. Thus, the BCCH carrier is conventionally transmitted with a constant high power. In contrast thereto, since only the BCCH carrier of neighboring cells is measured, the carrier on which only the traffic channels are transmitted may be power controlled.

The continuous transmission of a high power BCCH carrier, however, represents a serious problem in mobile radio systems since it brings about an increase in the interference level of the network. In detail, when a traffic channel carrier in the cell concerned is the same as the BCCH carrier of a nearby cell, interference in the reception of the traffic channel carrier is caused. This is due to the fact that the radio traffic between a base station and a mobile station to which that specific high power carrier is allocated causes crosstalk and thus disturbs the communication between other base stations and mobile stations using the same carrier. In addition, since the communication is performed between a base station and a specific mobile station at a constant power level, typically at full power, the available frequency spectrum cannot be used effectively, thus also decreasing the network capacity. As a result, these conventional GSM networks suffer from a comparatively low spectral efficiency.

In order to increase the spectral efficiency by keeping the interference in a mobile radio network as low as possible, the power transmitted on each channel is normally set to a minimum level just enough to maintain the communication between base station and mobile station, as is known e.g. from WO-95/07012 filed on Sep. 2, 1994, in the name of the applicants of the present invention. However, since a power control of the BCCH carrier is not available in conventional GSM networks, all traffic channels on that carrier have to be sent at a constant and relatively high power. This inevitably results in a high interference level. The interference is particularly high if only one transmission and reception frequency (TRX) is used by a base station acting as a base transceiver station.

SUMMARY OF THE INVENTION

It is, therefore, an object of the present invention to provide a method and an apparatus for determining the pathloss between a base transceiver station and a mobile station in a mobile radio network so as to allow a power control of the Broadcast Control Channel carrier, thereby reducing the interference in the network and increasing the capacity and traffic.

According to the present invention, this object is accomplished by a method for determining the pathloss between a first base transceiver station and a mobile station in a mobile radio network, the mobile station being spatially separated from the first base transceiver station and a second neighboring base transceiver station, the method comprising the steps of transmitting a signal carrier having a transmitting power from the first base transceiver station, detecting the signal level of the signal carrier transmitted by the first base transceiver station after having been received by the mobile station, transmitting the signal level detected by the mobile station from the mobile station to the second base transceiver station, receiving the signal level transmitted by the mobile station in the second base transceiver station, and comparing the transmitting power of the signal carrier transmitted by the first base transceiver station and the received signal level transmitted from the mobile station with each other, thereby obtaining the pathloss between the first base transceiver station and the mobile station.

According to the present invention, this object is also achieved by an apparatus for determining the pathloss between a first base transceiver station and a mobile station in a mobile radio network, the mobile station being spatially separated from the first base transceiver station and a second neighboring base transceiver station, the apparatus comprising transmitting means for transmitting a signal carrier having a transmitting power from the first base transceiver station, the signal level of the signal carrier transmitted from the transmitting means being detected by the mobile station and transmitted to the second base transceiver station, receiving means for receiving the signal level transmitted from the mobile station, and comparing means for comparing the transmitting power of the signal carrier transmitted by the transmitting means and the received signal level transmitted from the mobile station with each other, thereby obtaining the pathloss between the first base transceiver station and the mobile station.

In detail, a mobile station measures the signal level transmitted from neighboring base transceiver stations in the monitoring slot which is the sixth slot after the transmission slot. Since the time slot is known (with a certain accuracy) in which the mobile station measures the received signal level in its monitoring slot, and since also the actual transmitted power is known in that time slot, the average power transmitted on the particular channel which is measured can be calculated (over an averaging period). Then, the signal level measured by the mobile station is transmitted to the second base transceiver station using the Slow Associated Control Channel (SACCH) and passed on to the base station controller where it is compared with the average transmitted power. The actual pathloss, L, is estimated by calculating the difference between the average power transmitted by the first base transceiver station and the average signal level received by the mobile station in the concerned time slot according to the following equation:

$$L = a = 10 \text{ dB } \log[P_{TXAV}/P_{RXAV}] \qquad \text{(Eq. 1)}$$

where a denotes the attenuation between a mobile station and the first base transceiver station, i.e. the pathloss, L, therebetween, $P_{TXAV}$ denotes the averaged power of the signal transmitted from the first base transceiver station, and $P_{RXAV}$ denotes the averaged signal strength of the signal received by the mobile station.

The present invention is particularly suited for the usual transmission systems wherein the base transceiver stations are essentially synchronized. Due to the synchronization of the base transceiver stations, the timing relation between a particular mobile station and its base transceiver station as well as the neighboring base transceiver stations is accurately known, and, hence, the actual pathloss between a particular mobile station and all base transceiver stations concerned can be calculated with a very high accuracy.

Thus, since the present invention enables the reliable estimation of the actual pathloss with a high accuracy, control of the non-constant power of the BCCH carrier by the base transceiver station becomes possible. In detail, for a handover process, the mobile station is allocated to that base transceiver station which has the highest received signal level. Therefore, in order to assure a communication having the best possible transmission quality already at the beginning of the radio link, it is indispensable to know the actual pathloss between the mobile station and the base transceiver station.

In addition, since it has become possible to effect a power control of the BCCH carrier, the power consumption of the transmission can be significantly decreased. If the BCCH carrier is power controlled, it is possible to individually control the transmitting powers at the corresponding frequencies used by the base transceiver stations so that the use of the frequency spectrum and, thus, the spectral efficiency can be maximized in the mobile radio network. This permits the following advantages:

1) Considerable reduction of the generated interference.

2) The method and the apparatus according to the present invention allow more traffic than the prior art systems since the same radio channels can be re-used at a shorter distance than has been possible with the prior art systems.

3) Hence, the capacity of a mobile radio system incorporating the method and/or the apparatus according to the present invention can be improved.

According to the present invention, only little additional equipment is necessary for determination of the pathloss, but no change of the transmission system is required. That is, the method and the apparatus according to the present invention still fully conform to the GSM recommendation.

The preferred embodiments of the present invention will be described in detail below by way of example with reference to the accompanying drawings.

BRIEF DESCRIPTION OF THE DRAWINGS

Hereinbelow, the preferred embodiments of the present invention will be described with reference to the accompanying drawings, in which.

DETAILED DESCRIPTION OF THE INVENTION INCLUDING THE BEST MODES OF CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications and patent applications cited in this specification are herein incorporated by reference as if each individual publication or patent application were specifically and individually indicated to be incorporated by reference.

Figure 1:
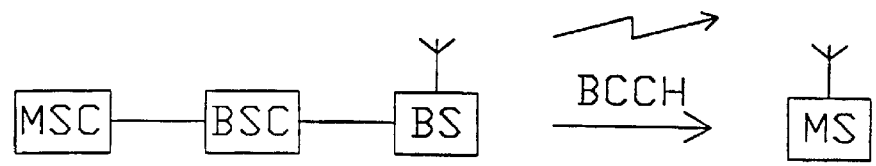
FIG. 1 is a block circuit diagram illustrating the conventional structure of the mobile radio network including a mobile station in a single cell according to the GSM recommendation.
Figure 2:
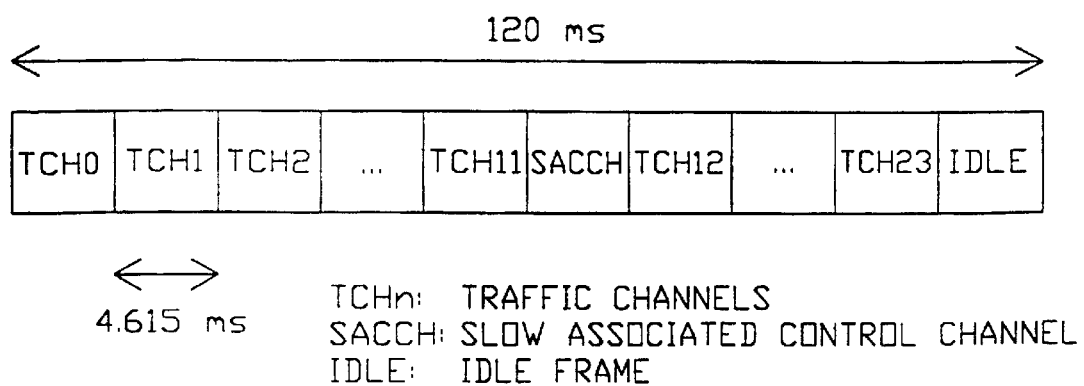
FIG. 2 is a diagram showing the conventional structure of a multi-frame consisting of 26 frames according to the GSM recommendation.

FIGS. 1 and 2 have been described above in connection with the discussion of the current conventional set up of a mobile radio network.

Figure 3:
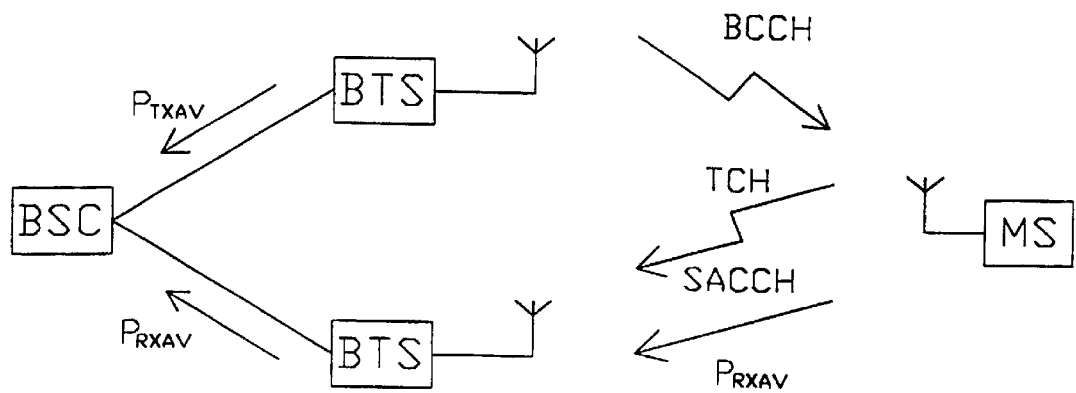
FIG. 3 is a diagram showing a transmission system according to an embodiment of the present invention.

FIG. 3 is a diagram showing an arrangement for a transmission system according to an embodiment of the present invention and serving to illustrate a method for determining the pathloss between a base transceiver station BTS and a mobile station MS in a mobile radio network according to the present invention. The arrangement shown in FIG. 3 and being part of a mobile radio network comprises at least a base station controller BSC, at least two neighboring base stations BS acting as base transceiver stations BTS-1 and BTS-2 (only two of which are shown in FIG. 3 for the sake of clarity) and a mobile station MS spatially separated from the base transceiver stations BTS-1 and BTS-2.

As shown in FIG. 3, the signal carrier BCCH having a certain transmitting power $P_{TXAV}$ is transmitted from one of the base transceiver stations BTS-1. More specifically, the quantity $P_{TXAV}$ denotes the transmitting power of the BCCH carrier averaged over a particular time period. In the mobile station MS which receives the signal carrier BCCH, the signal level $P_{RXAV}$ of this signal carrier BCCH is detected and averaged. Thereafter, this detected signal level $P_{RXAV}$ is retransmitted from the mobile station MS to the other base transceiver station BTS-2. In detail, the detected signal level $P_{RXAV}$ is part of the measurement results which are reported regularly from a particular mobile station MS to the base transceiver station BTS-n concerned. For this purpose, the mobile station MS transmits the detected signal level $P_{RXAV}$ of the received signal carrier BCCH to the base transceiver station BTS-2, preferably using the Slow Associated Control Channel (SACCH).

Then the average received signal level $P_{RXAV}$ transmitted by the mobile station MS is received in the second base transceiver station BTS-2. Both the average transmitting power $P_{TXAV}$ of the signal carrier BCCH transmitted by the first base transceiver station BTS-1 as well as the average received signal level $P_{RXAV}$ reported from the mobile station MS via BTS-2 are passed to the base station controller BSC. This base station controller BSC controls at least the two neighboring base transceiver stations BTS-1 and 2.

Furthermore, in the base station controller BSC, the average received signal level $P_{RXAV}$ which has been retransmitted from the mobile station MS is compared to the average transmitting power $P_{TXAV}$ of the signal carrier BCCH which has been transmitted by the base transceiver station BTS-1. Thus, the pathloss between any base transceiver station BTS and a mobile station MS is obtained.

The arrangement shown in FIG. 3 may preferably be part of a synchronized cellular radio network used in an office or microcellular system. In this system, the mobile station MS is separated from the base transceiver stations BTS only by a short distance compared to the transmission range of the base transceiver stations BTS.

Figure 4:
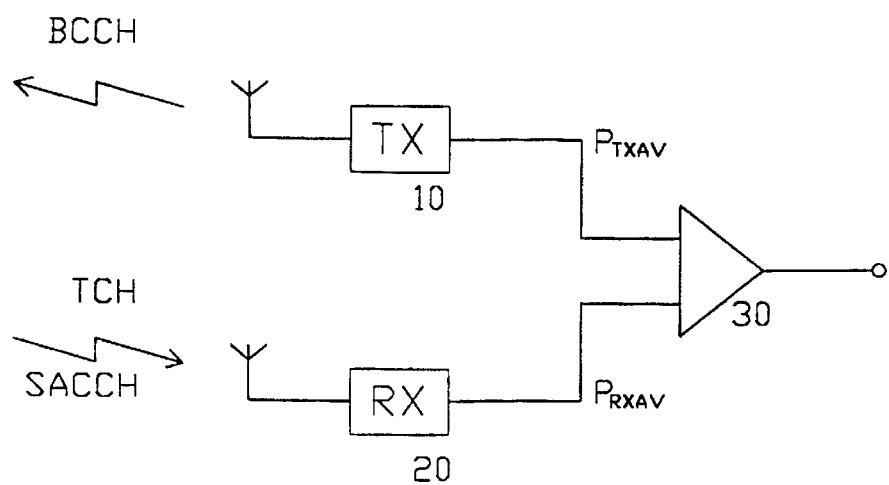
FIG. 4 is a block circuit diagram showing an apparatus for determining the pathloss between a base transceiver station and a mobile station in a mobile radio network according to an embodiment of the present invention.

FIG. 4 shows a block circuit diagram of an apparatus for determining the pathloss between a base transceiver station BTS and a mobile station MS in a mobile radio network according to the embodiment of the present invention. As shown in FIG. 4, the apparatus according to the present invention comprises transmitter 10, receiver 20 and comparing means or comparator 30. While the transmitting means 10 may be located in the first base transceiver station BTS-1 shown in FIG. 3, the receiving means 20 may constitute a part of the other base transceiver station BTS-2. More specifically, the transmitting means 10 transmits the signal carrier BCCH having an average transmitting power $P_{TXAV}$ from one of the base transceiver stations BTS-1. After the received signal level $P_{RXAV}$ of the signal carrier BCCH has been detected and averaged by the mobile station MS, it is transmitted to the other base transceiver station BTS-2. The receiving means 20, in turn, receives the average received signal level $P_{RXAV}$ transmitted from the mobile station MS. Both the average transmitting, power $P_{TXAV}$ of the signal carrier BCCH transmitted by the transmitting means 10 as well as the average signal level $P_{RXAV}$ received by the mobile station MS are then compared with each other by the comparing means 30. The comparing means 30 may be provided in the base station controller BSC shown in FIG. 3. Furthermore, the comparing means 30 outputs a signal at an output terminal, T, which indicates the difference between these two signal levels. This output difference signal is a measure of the pathloss, L, between the base transceiver stations BTS and the mobile station MS. As a result, the pathloss between a base transceiver station and a mobile station in a cellular mobile radio network has been effectively determined by the method and apparatus of the invention.

Preferably, the transmission of the signal carrier BCCH by one of the base transceiver stations, the detection of the average received signal level $P_{RXAV}$ thereof in the mobile station MS, the reception of the detected signal level $P_{RXAV}$ transmitted from the mobile station MS as well as the comparison of the two signal levels are performed with respect to at least a selected one of a plurality of time slots.

According to a presently preferred embodiment of the present invention, this one selected time slot is the monitoring time slot. The monitoring time slot is the sixth time slot after the transmission time slot.

Thus, according to the embodiment of the present invention, the power of the BCCH carrier of the base transceiver stations is controlled using the measurement results transmitted from the mobile station to the neighboring base transceiver stations. Hence, the power consumption of the base transceiver station can be remarkably decreased. In addition, the efficiency of the use of the frequency spectrum can be improved while maintaining a good connection quality.

While the above description referred to the application of the present invention to the GSM mobile radio system, it is to be understood that the present invention can be applied to any other type of radio transmission.

It should be understood that the above description has been made only with reference to the preferred embodiments of the present invention. For example, reference to BTS-1 and 2 should be understood to refer to any pair of base transceiver stations, and each can perform the function of transmitting BCCH and receiving the $P_{RXAV}$ signal from any mobile station, n, n2 in a transmission network. Therefore, the present invention is not limited to the above described preferred embodiments, but is also intended to cover any variations and modifications to be made by a person skilled in the art within the spirit and scope of the present invention as defined in the appended claims.

There are disclosed a method and an apparatus for determining the pathloss between a base transceiver station BTS and a mobile station MS in a mobile radio network. In detail, a signal carrier BCCH having a transmitting power $P_{TXAV}$ is transmitted by a first base transceiver station BTS. Thereafter, said signal carrier BCCH transmitted by said first base transceiver station BTS is received by a mobile station MS spatially separated from said first base transceiver station BTS, and the signal level $P_{RXAV}$ of the received signal carrier BCCH is detected by said mobile station MS. Furthermore, the detected signal level $P_{RXAV}$ of said received signal carrier BCCH is transmitted to a second base transceiver station BTS of a neighboring cell. In addition, the detected signal level $P_{RXAV}$ of said signal carrier BCCH received by said mobile station MS is compared with the transmitting power $P_{TXAV}$ of said signal carrier BCCH transmitted by said first base transceiver station BTS. A signal is then output which indicates the difference between these two signal levels, this difference being a measure of the pathloss between said first base transceiver station BTS and said mobile station MS. As a result, it becomes possible to effectively determine the pathloss between a base transceiver station and a mobile station in a cellular mobile radio network.

What is claimed is:

1. A method for determining the pathloss between a first base transceiver station (BTS-1) and a mobile station (MS) in a mobile radio network, said mobile station (MS) being spatially separated from said first base transceiver station (BTS-1) and a second neighboring base transceiver station (BTS-2); said method comprising the steps of:
   a) transmitting a signal carrier (BCCH) having a transmitting power ($P_{TXAV}$) from said first base transceiver station (BTS-1);
   b) detecting the signal level ($P_{RXAV}$) of said signal carrier (BCCH) transmitted by said first base transceiver station (BTS-1) after having been received by said mobile station (MS);
   c) transmitting the signal level ($P_{RXAV}$) detected by said mobile station (MS) from said mobile station (MS) to said second base transceiver station (BTS-2);
   d) receiving the signal level ($P_{RXAV}$) transmitted by said mobile station (MS) in said second base transceiver station (BTS-2); and
   e) comparing the transmitting power ($P_{TXAV}$) of the signal carrier (BCCH) transmitted by said first base transceiver station (BTS-1) and the received signal level ($P_{RXAV}$) transmitted from said mobile station (MS) with each other, thereby obtaining the pathloss between said first base transceiver station (BTS-1) and said mobile station (MS), wherein said pathloss measurement result is used to control the power of the BCCH carrier.

2. The method according to claim 1, wherein said mobile station (MS) transmits the detected signal level ($P_{RXAV}$) of said received signal carrier (BCCH) to said second base transceiver station (BTS-2) using the Slow Associated Control Channel (SACCH) of a GSM network.

3. The method according to claim 1, wherein the method is carried out in a synchronized cellular radio network, said mobile station (MS) being separated from at least one of said base transceiver stations (BTS) by a short distance compared to the transmission range of said base transceiver stations (BTS).

4. The method according to claim 2, wherein the method is carried out in a synchronized cellular radio network, said mobile station (MS) being separated from at least one of said base transceiver stations (BTS) by a short distance compared to the transmission range of said base transceiver stations (BTS).

5. The method according to 1, wherein said signal carrier (BCCH) transmitting step, said detecting step, said signal level ($P_{RXAV}$) transmitting step, said receiving step and said comparing step are performed with respect to at least one of a plurality of time slots.

6. The method according to 2, wherein said signal carrier (BCCH) transmitting step, said detecting step, said signal level ($P_{RXAV}$) transmitting step, said receiving step and said comparing step are performed with respect to at least one of a plurality of time slots.

7. The method according to 3, wherein said signal carrier (BCCH) transmitting step, said detecting step, said signal level ($P_{RXAV}$) transmitting step, said receiving step and said comparing step are performed with respect to at least one of a plurality of time slots.

8. The method according to claim 5, wherein:
   a) said plurality of time slots includes at least 7 time slots and includes a transmission time slot and a monitoring time slot;
   b) said monitoring time slot is the sixth time slot after said transmission time slot; and
   c) said one time slot with respect to which said steps are performed is the monitoring time slot.

9. The method according to claim 6, wherein:
   a) said plurality of time slots includes at least 7 time slots and includes a transmission time slot and a monitoring time slot;
   b) said monitoring time slot is the sixth time slot after said transmission time slot; and
   c) said one time slot with respect to which said steps are performed is the monitoring time slot.

10. The method according to claim 7, wherein:
    a) said plurality of time slots includes at least 7 time slots and includes a transmission time slot and a monitoring time slot;
    b) said monitoring time slot is the sixth time slot after said transmission time slot; and
    c) said one time slot with respect to which said steps are performed is the monitoring time slot.

11. An apparatus for determining the pathloss between a first base transceiver station (BTS-1) and a mobile station (MS) in a mobile radio network, said mobile station (MS) being spatially separated from said first base transceiver station (BTS-1) and a second neighboring base transceiver station (BTS-2), said apparatus comprising:
    a) at least one transmitter (10) for transmitting a signal carrier (BCCH) having a transmitting power ($P_{TXAV}$) from said first base transceiver station (BTS-1), the signal level ($P_{RXAV}$) of said signal carrier (BCCH) transmitted from said transmitter (10) being detected by said mobile station (MS) and transmitted to said second base transceiver station (BTS-2);
    b) at least one receiver (20) for receiving the signal level ($P_{RXAV}$) transmitted from said mobile station (MS); and
    c) at least one comparator (30) for comparing the transmitting power ($P_{TXAV}$) of the signal carrier (BCCH) transmitted by said transmitting means (10) and the received signal level ($P_{RXAV}$) transmitted from said mobile station (MS) with each other, said comparator outputting a signal representative of the pathloss between said first base transceiver station (BTS-1) and said mobile station (MS).

12. The apparatus according to claim 11, wherein said mobile station (MS) transmits the detected signal level ($P_{RXAV}$) of said received signal carrier (BCCH) to said second base transceiver station (BTS-2) using the Slow Associated Control Channel (SACCH) of a GSM network.

13. The apparatus according to claim 11, wherein said apparatus is part of a synchronized cellular radio network, said mobile station (MS) being separated from at least one of said base transceiver stations (BTS) by a short distance compared to the transmission range of said base transceiver stations (BTS).

14. The apparatus according to claim 12, wherein said apparatus is part of a synchronized cellular radio network, said mobile station (MS) being separated from at least one of said base transceiver stations (BTS) by a short distance compared to the transmission range of said base transceiver stations (BTS).

15. The apparatus according to claim 11, wherein said transmitter (10), said receiver (20) and said comparator (30) operate with respect to at least one of a plurality of time slots.

16. The apparatus according to claim 12, wherein said transmitter (10), said receiver (20) and said comparator (30) operate with respect to at least one of a plurality of time slots.

17. The apparatus according to claim 13, wherein said transmitter (10), said receiver (20) and said comparator (30) operate with respect to at least one of a plurality of time slots.

18. The apparatus according to claim 15, wherein:
   a) said plurality of time slots includes at least 7 time slots and includes a transmission time slot and a monitoring time slot;
   b) said monitoring time slot is the sixth time slot after said transmission time slot; and
   c) said one time slot with respect to which said means operate is the monitoring time slot.

19. The apparatus according to claim 16, wherein:
   a) said plurality of time slots includes at least 7 time slots and includes a transmission time slot and a monitoring time slot;
   b) said monitoring time slot is the sixth time slot after said transmission time slot; and
   c) said one time slot with respect to which said means operate is the monitoring time slot.

20. The apparatus according to claim 17, wherein:
   a) said plurality of time slots includes at least 7 time slots and includes a transmission time slot and a monitoring time slot;
   b) said monitoring time slot is the sixth time slot after said transmission time slot; and
   c) said one time slot with respect to which said means operate is the monitoring time slot.

21. The method according to claim 1, comprising the further step of controlling said transmitting power ($P_{TXAV}$) of said transmitting signal carrier (BCCH) from at least one base transceiver station (BTS) in response to said determined pathloss.

22. The method according to claim 21, wherein said controlling step includes reducing said transmitting power ($P_{TXAV}$) of said transmitting signal carrier (BCCH) from at least a first base transceiver station (BTS-1) to reduce interference generated between said first base transceiver station (BTS-1) and at least a second base transceiver station (BTS-2).

23. The method according to claim 21, wherein said controlling step includes reducing said transmitting power ($P_{TXAV}$) of said transmitting signal carrier (BCCH) from at least a first base transceiver station (BTS-1) to increase transmission traffic in said network by permitting a reduced distance between said first base transceiver station (BTS-1) and at least a second base transceiver station (BTS-2).

24. The method according to claim 21, wherein said controlling step includes reducing said transmitting power ($P_{TXAV}$) of said transmitting signal carrier (BCCH) from at least a first base transceiver station (BTS-1) to increase the capacity of said network by permitting a reduced distance between said first base transceiver station (BTS-1) and at least a second base transceiver station (BTS-2).

* * * * *